United States Patent [19]

Shima et al.

[11] 3,811,084

[45] May 14, 1974

[54] HIGH VOLTAGE SEMICONDUCTOR RECTIFYING DEVICE

[75] Inventors: Kenzo Shima; Kensuke Suzuki; Tatuo Yosimura; Takeshi Sasaki, all of Hitachi-shi, Japan

[73] Assignee: Hitachi, Ltd., Tokyo, Japan

[22] Filed: Aug. 6, 1971

[21] Appl. No.: 169,678

[30] Foreign Application Priority Data

Aug. 12, 1970 Japan ............................... 45-70068

[52] U.S. Cl. ................ 321/11, 29/558, 317/234 W, 317/256

[51] Int. Cl. ................................................... H02m

[58] Field of Search .... 317/234 W, 234 H, 234 UA, 317/256; 29/558, 559; 321/11

[56] References Cited

UNITED STATES PATENTS

| | | | |
|---|---|---|---|
| 3,394,037 | 7/1968 | Robinson | 317/235 AM |
| 3,474,309 | 10/1969 | Stehlin | 317/235 AM |
| 3,559,035 | 1/1971 | Schimmer | 321/8 R |
| 3,617,825 | 11/1971 | Chilton et al. | 317/234 H |
| 3,657,632 | 4/1972 | Miyoshi | 321/8 R |
| 3,373,335 | 3/1968 | Rosenberg | 321/11 |
| 3,278,826 | 10/1966 | Walker | 321/11 X |
| 3,469,171 | 9/1969 | Toulemonde | 321/11 X |
| 3,128,421 | 4/1964 | Skellett | 317/256 X |
| 3,454,841 | 7/1969 | Urba et al. | 317/234 W |
| 3,398,351 | 8/1968 | Kuntke | 321/11 |
| 3,444,452 | 5/1969 | Janssen | 321/11 |

FOREIGN PATENTS OR APPLICATIONS

| | | | |
|---|---|---|---|
| 1,265,285 | 4/1968 | Germany | 321/11 |

*Primary Examiner*—William H. Beha, Jr.
*Attorney, Agent, or Firm*—Craig & Antonelli

[57] ABSTRACT

A high voltage semiconductor rectifying device comprising a rod-like stack of a plurality of silicon pellets and means to provide additional capacitance to silicon pellets nearer the a-c side electrode.

5 Claims, 10 Drawing Figures

INVENTORS

KENZO SHIMA, KENSUKE SUZUKI,

TATUO YOSIMURA, TAKESHI SASAKI

BY Craig, Antonelli & Hill

ATTORNEYS

PATENTED MAY 14 1974 3,811,084

INVENTORS

KENZO SHIMA, KENSUKE SUZUKI,

TATUO YOSIMURA, TAKESHI SASAKI

BY Craig, Antonelli & Hill

ATTORNEYS

INVENTORS

KENZO SHIMA, KENSUKE SUZUKI,

TATUO YOSIMURA, TAKESHI SASAKI

BY Craig, Antonelli & Hill

ATTORNEYS

HIGH VOLTAGE SEMICONDUCTOR RECTIFYING DEVICE

BACKGROUND OF THE INVENTION

1. Field of the Invention

This invention relates to high voltage semiconductor rectifying devices.

2. Description of the Prior Art

In a high voltage semiconductor rectifying device consisting of many semiconductor pellets stacked together, the voltage across it is usually not uniformly shared among the semiconductor pellets but is concentrated to semiconductor pellets nearer the a-c side electrode.

SUMMARY OF THE INVENTION

An object of the invention is to provide a high voltage semiconductor rectifying device for use in high voltage circuits.

Another object of the invention is to provide a high voltage semiconductor rectifying device comprising a rod-like stack of many silicon pellets, in which the voltage distribution among the pellets is uniform.

A further object of the invention is to provide a high voltage semiconductor rectifying device, which is small in size and can be manufactured at a low cost.

DESCRIPTION OF THE PREFERRED EMBODIMENTS

The high voltage semiconductor rectifying device can find extremely broad applications. It is an essential element in a high voltage power source circuit in television receiving sets, cathode-ray oscillographs, X-ray apparatus, electron microscopes, charged particle accelerating apparatus and so forth.

Figure 1:
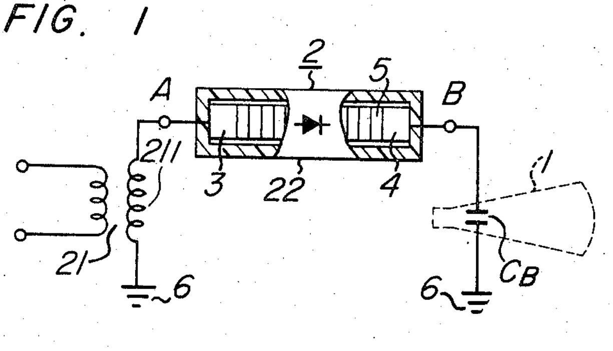
FIG. 1 is a schematic representation of a usual high voltage power source circuit for a television receiving set.

FIG. 1 shows a high voltage semiconductor rectifying device applied to a high voltage power source circuit for a television receiving set.

Referring to the Figure, reference numeral 1 designates a cathode-ray tube, and numeral 2 a high voltage power source circuit for supplying a d-c voltage to the tube. The power source circuit comprises a flyback transformer 21 and a high voltage semiconductor rectifying device connected between the secondary 211 of the flyback transformer and the cathode-ray tube 1. Since high-voltage low-current power is supplied to the cathode-ray tube 1, the high voltage semiconductor rectifying device 22 in the high voltage power source usually has a construction consisting of a rod-like lamination of many semiconductor pellets 5 clamped between electrodes 3 and 4 in pairs. In such a high voltage semiconductor rectifying device as 22, however, semiconductor pellets near the a-c side terminal A are likely to be disrupted due to overload. This is thought to stem from the floating capacitance between these semiconductor pellets and the earth 6. Through the floating capacitance, varying current is caused to flow in the high voltage semiconductor rectifying device. More current flows in part of the device nearer the a-c side, so that excessive current is concentrated in semiconductor pellets near the a-c side terminal A. Since the extra current gives rise to a corresponding voltage drop, the voltage distribution over the individual semiconductor pellets is not uniform, the voltage gradient being sharper for semiconductor pellets nearer the terminal A and progressively becoming gradual toward the terminal B. Therefore, semiconductor pellets nearer the a-c side terminal are subject to insulation breakdown.

To overcome this drawback, it has been proposed to connect an appropriate impedance in parallel with the semiconductor pellets near the a-c side terminals so as to obtain uniform voltage distribution, as disclosed in U.S. Pat. No. 3,231,798.

The device disclosed in the afore-mentioned specification comprises a rectifying body consisting of many selenium pellets stacked within a cylindrical insulating casing and is provided with a heat radiating means thermally coupled to an a-c side terminal and consisting of a central metal bolt connected to a rectifying plate disposed at one end of the rectifying body. The heat radiating means mentioned above has a funnel-like shape, tending to increase the size of the high voltage semiconductor rectifying device. Also, the junction capacity of selenium is large, with the breakdown voltage of one selenium pellet being about 60 volts at the utmost. Therefore, to provide the required high breakdown voltage it is necessary to stack several hundred pellets in the same direction, which requires very troublesome work during manufacture. Further, selenium is thermally inferior to silicon. For high voltage selenium rectifiers the upper limit of the ambient temperature is about 60° C, but the temperature inside television receiver sets and the like is likely to exceed 60° C under the worst condition, so that reliability is inferior.

In order to overcome the above drawbacks the semiconductor pellets should be made of silicon instead of selenium. However, silicon pellets present new problems. More particularly, due to extremely small junction capacitance the non-uniformity of the voltage shared among the pellets is more serious. Also, care should be paid to improve the lateral breakdown voltage.

According to the invention, the above drawbacks are overcome by the provision of a high voltage semiconductor rectifying device comprising at least one rectifying unit including a rod-like stack of a plurality of silicon pellets, a pair of electrodes provided to opposite ends of said rod-like stack, each said electrode being provided with a lead, and a first insulating member closely covering said rod-like stack, at least one conducting wire extending substantially parallel to said rod-like stack from the a-c side electrode of said electrodes toward the d-c side one of said electrodes, said conducting wire being held at the same potential as said a-c side electrode, and a second insulating member integrally enclosing said rectifying unit and said conducting wire.

The invention will now be described in conjunction with some preferred embodiments.

Figure 2:
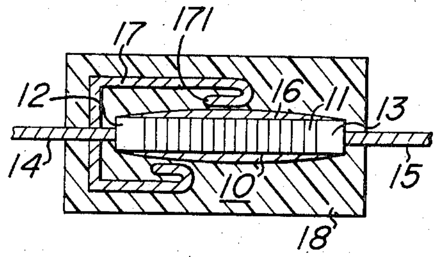
FIG. 2 is a sectional view showing an embodiment of the high voltage semiconductor rectifying device according to the invention.

Referring to FIG. 2, reference numeral 11 designates a rod-like stack of a plurality of silicon pellets bonded together and each having one p-n junction. The pellet stack 11 is clamped at its opposite ends between electrodes 12 and 13 (a-c and d-c electrodes) in pairs. Numerals 14 and 15 designate leads leading from the electrodes 12 and 13. These parts constitute a rectifying unit 10. Numeral 16 designates a first insulating member of a material such as varnish closely covering the rectifying unit 10, and particularly pellet stack 11, so as not to define any air gap between the pellet stack 11 and the outer casing. Numeral 17 designates a lead wire extending substantially in parallel with the pellet stack 11 toward the d-c electrode 13 and connected at one end to the lead 14 on the side of the a-c electrode 12. The lead wire 17 has its end remote from the lead 14 folded as indicated at 171 to prevent concentration of the electric filed thereat. Numeral 18 designates a second insulating member of such material as epoxy resin enclosing the rectifying unit 10 and the lead wire 17.

With the high voltage semiconductor rectifying device described above, the voltage thereacross can be uniformly shared among the individual silicon pellets, so that it can be used in high voltage circuits.

Figure 3:
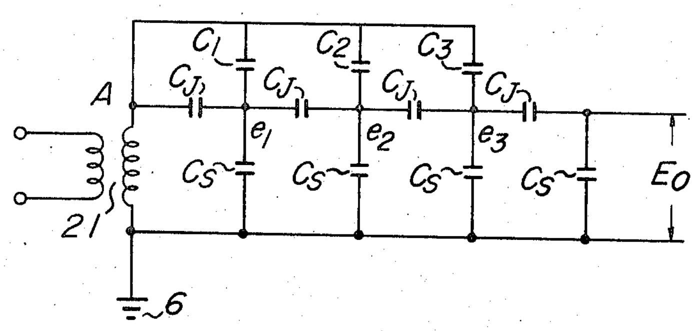
FIG. 3 shows an equivalent circuit to illustrate the operation of the high voltage semiconductor rectifying device according to the invention.

FIG. 3 shows an equivalent circuit to a high voltage power source circuit for a television set using the high voltage semiconductor rectifying device described above.

Reference character $C_J$ designates the junction capacitance of each silicon pellet, character $C_s$ the floating capacitance between each silicon pellet and the earth 6, characters $C_1$, $C_2$ and $C_3$ additional capacitances between the respective silicon pellets and the conductor, character $e$ the potential between adjacent junction capacitances and between each floating capacitance $C_s$ and a corresponding one of the additional capacitances $C_1$, $C_2$ and $C_3$, and character $E_O$ a d-c output voltage.

In the equivalent circuit of FIG. 3, there holds an equation $$\begin{aligned} Q &= C_sE \\ &= (C_j + C_s + C_1)e_1 - (e_2 - e_1)C_j \\ &= (C_s + C_2)e_2 + (e_2 - e_1)C_j - (e_3 - e_2)C_j \\ &= (C_s + C_3)e_3 + (e_3 - e_1)C_j - (E_O - e_3)C_j \end{aligned} \quad (1)$$

where $Q$ is a constant quantity of charge. Assuming the voltage across the rectifying unit to be shared uniformly, $$e_1 = 1/4\, E_O,\ e_2 = 1/2\, E_O,\ e_3 = 3/4\, E_O \text{ and } \overline{e_O} = E_O \quad (2)$$

Substitution of equations (2) into equation (1) gives $$C_1 = 3\, C_s,\ C_2 = C_s, \text{ and } C_3 = 1/3\, C_s \quad (3)$$

It will be seen that by selecting the additional capacitances $C_1$, $C_2$ and $C_3$ in parallel with the respective silicon pellets such as in equations (3), the voltage across the rectifying unit is uniformly shared among the individual pellets.

As is made apparent, according to the invention by providing the conductor 17 additional capacitances are externally provided to a-c side silicon pellets to equivalently increase the junction capacitance $C_j$ of the a-c side silicon pellets so as to cancel the influence of the floating capacitance $C_s$. As is apparent from equation (3) it is ideal to make the distance between the conductor 17 and the rectifying unit 10 progressively greater from the side of the a-c electrode 12 to the side of the d-c electrode. However, it has been experimentally confirmed that even with the conductor 17 extending substantially parallel to the rectifying unit 10 as in the instant embodiment, sufficiently uniform sharing of the voltage can be obtained so long as the conductor 17 extends along only part of the rectifying unit 10 on the a-c side thereof.

With this construction, it is possible to reduce the size of and increase the dimensional accuracy of the high voltage semiconductor rectifying device.

If the conductor 17 for providing additional capacitances to an a-c side portion of the rectifying unit 10 is a thin wire, it should be so treated as to eliminate a sharp end so that electric field may not concentrate at the wire end. To this end, folding the end portion of the wire as indicated at 171 in FIG. 2 is the simplest measure, but other suitable measures may also be adopted such as providing a spherical member to the wire end, winding a conducting tape on the wire or applying a conductive coating to the wire. Such treatment is essential where the voltage across the high voltage semiconductor rectifying device is high.

As mentioned earlier, the lateral breakdown voltage of the silicon pellets is extremely low compared with their p-n junction breakdown voltage (reverse voltage). Therefore, in constructing the high voltage semiconductor rectifying device by stacking silicon pellets into a rod-like stack provisions should be made for improving the lateral breakdown voltage of the pellets. According to the invention, the rod-like stack of the silicon pellets is closely covered with the first insulating member 16, as shown in FIG. 2. With this measure, the lateral breakdown voltage of the silicon pellets can be increased to the breakdown voltage of the insulating member.

In addition, the rectifying unit 10 is enclosed together with the conductor 17 in the second insulating member 18. Thus, it is possible to reduce the size of the high voltage semiconductor rectifying device.

Figure 4A:
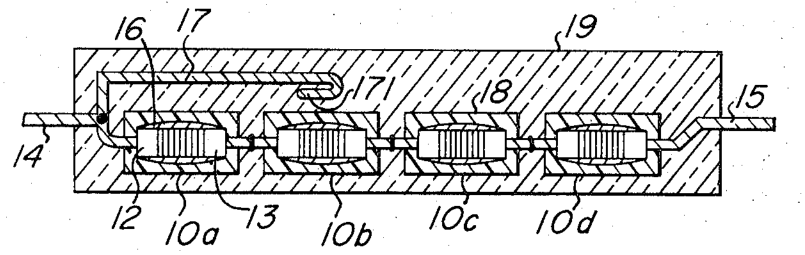
FIGS. 4*a* and 4*b* are sectional views showing other embodiments of the high voltage semiconductor rectifying device according to the invention.

FIG. 4*a* shows another embodiment of the high voltage semiconductor rectifying device according to the invention. This embodiment consists of four rectifying units 10*a*, 10*b*, 10*c* and 10*d* all enclosed in a third insulating member 19 of such material as an epoxy resin. With this construction, the yield can be improved. The higher the voltage across the high voltage semiconductor rectifying device, the greater is the number of silicon pellets required to be stacked together and the rod-like stack is longer. In this embodiment, even if one rectifying unit has a failure pellet the device can operate satisfactorily.

Figure 4B:
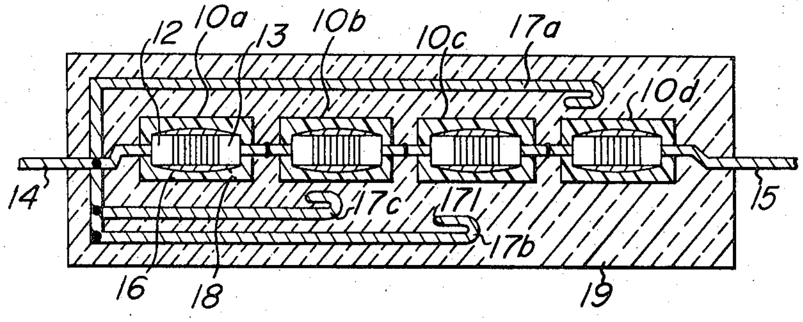

In the device of FIG. 4a, the wire 17 extends up to the neighborhood of the d-c electrode 13 of the second rectifying unit 10b. Where the voltage across the high voltage semiconductor rectifying device is high, requiring a long pellet stack or a plurality of rectifying units (four units in the illustrated device) connected in series, several wires 17a, 17b and 17c may be provided as shown in FIG. 4b.

Table 1 below lists voltage proportions shared by the individual rectifying units 10a, 10b, 10c and 10d when the high voltage semiconductor rectifying device as shown in FIG. 4 in a high voltage power source for a television set.

TABLE 1

| Rectifying unit | 10a | 10b | 10c | 10d |
|---|---|---|---|---|
| Device A | 80% | 15% | 3% | 2% |
| Device B | 20% | 30% | 30% | 20% |

The device A has no conductor like the one 17, while the device B is provided with the conductor 17 in accordance with the invention.

As is seen from the Table, in the device B according to the invention the voltage distribution is more uniform compared to the device A.

The manufacture of a high voltage semiconductor rectifying device according to the invention will now be described with reference to FIGS. 5a–5c.

Figure 5A:
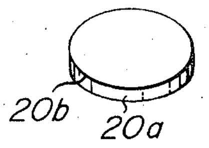
FIGS. 5*a* to 5*d* illustrate, in perspective and sectional views, the steps of manufacture of the high voltage semiconductor rectifying device according to the invention.

FIG. 5a shows a single silicon wafer prepared by depositing by a known method aluminum to a thickness of about 10 microns on one or both of the principal surfaces 20b of a silicon substrate 20a. A plurality of such silicon wafer 20a are stacked together with the principal surface side provided with the aluminum deposition film orientated in a constant direction. In place of stacking silicon wafers having an aluminum film, it is also possible to insert an aluminum foil between adjacent silicon wafers without aluminum films.

Figure 5B:
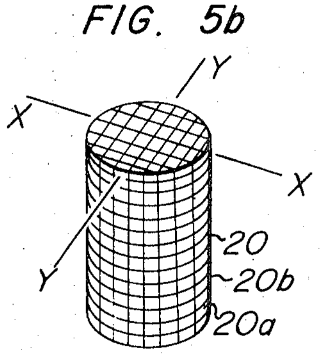
Figure 5C:
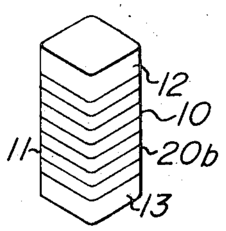

The stack obtained in the above manner is then placed in a furnace and heated at a temperature of 700° C for 10 minutes to bond the silicon substrates 20a together by the intervening aluminum, thus forming a cylindrical semiconductor block 20 as shown in FIG. 5b.

The semiconductor block 20 thus obtained is then longitudinally sliced along parallel planes parallel to the illustrated lines X—X and Y—Y. In the above manner, rectangular rod-like stack bodies as typically shown in FIG. 5c may be obtained. The corners of the rod-like stack 11 thus obtained are rounded to avoid the concentration of electric field at the corners thereby preventing reduction of the breakdown voltage. Then, tungsten electrodes 12 and 13 having the same coefficient of thermal expansion as that of silicon are bonded to the opposite ends of the rod-like stack 11 by means of aluminum, thus completing the rectifying unit 10. Since tungsten is hard and cannot be sliced, the electrodes are individually formed by the powder moulding method.

Figure 5D:
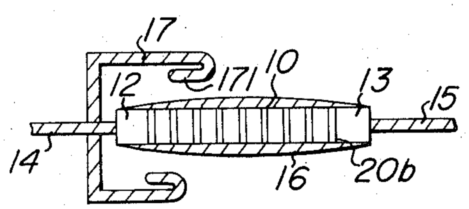

Thereafter, leads 14 and 15 of conducting wires such as copper wire are electrically welded to the respective electrodes 12 and 13 of the rectifying unit 10, as shown in FIG. 5d. Then, the stack 11 and the electrodes 12 and 13 are covered with the first insulating member 16 of varnish. Then, a conducting wire 17 having a folded end portion is electrically welded to the a-c side lead 14. Then, the assembly is covered in the second insulating material such as an epoxy resin. In the above manner, the high voltage semiconductor rectifying device as shown in FIG. 2 can be obtained.

Figure 6:
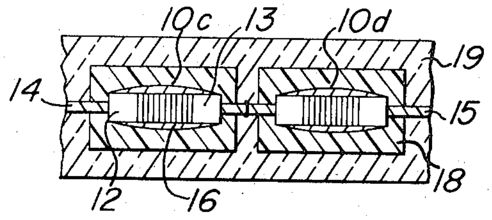
FIG. 6 is a sectional view showing the high voltage semiconductor rectifying device according to the invention.

In the above manufacturing method, the electrodes 12 and 13 must be separately formed by the powder moulding method and then individually attached to the stack 11, so that the production efficiency and yield are very inferior. This drawback can be overcome by previously bonding the electrodes in the form of p-type or n-type high impurity concentration silicon wafers to the semiconductor block 20 so that the slicing thereof directly gives rod-like stacks 11. In this case, the electrode wafer should be thicker than the silicon wafers forming the p-n junctions.

Where a plurality of rectifying units 10 are connected in series, the construction shown in FIGS. 4a and 4b is suitable for facilitating the assemblage of the units into television sets and reducing the size of the high voltage semiconductor rectifying device. This construction will now be described in further detail in connection with FIG. 6. There are shown in rectifying units 10c and 10d, which are covered with respective second insulating members 18, which are in turn covered with a third insulating member 19. This construction can be obtained by the so-called two-stage moulding method. In the first stage, each stack is placed within a corresponding mould. Subsequently, molten epoxy resin or silicon resin is poured into the mould and solidified, thus forming the second insulating member 18. In the second stage, the rectifying units 10c and 10d having the second insulating covering formed in the first stage are placed within a second mould, and the same molten resin as that used in the first stage is poured into the second mould and is cured at a curing temperature equal to or below that in the first moulding stage, thus obtaining a third insulating member 19.

In the conventional two-stage moulding method, the curing temperature in the second moulding stage is higher than the curing temperature in the first moulding stage, so that the moulding formed in the first moulding stage is affected by the curing temperature in the second moulding stage. More particularly, the moulding formed in the first moulding stage undergoes expansion in the second stage, so that the silicon pellets and electrodes, which are integral with the moulding and have a lower coefficient of thermal expansion, are likely to be damaged or peeled off, thus resulting in a failure percentage of about 10 percent.

In the two-stage moulding method described above according to the invention, the failure percentage can be improved to almost zero percent.

In the semiconductor device used in the high voltage power source, the insulating members are likely to catch fire due to corona discharge and spark discharge. This problem can be overcome by using non-combustible resins such as polypropylene and low combustible epoxy resins to form the insulating members.

As has been described in the foregoing, according to the invention it is possible to provide a small-size high voltage semiconductor rectifying device free from partial voltage concentration on the a-c side silicon pellets.

We claim:

1. A high voltage semiconductor rectifying device comprising a plurality of rectifying units connected in series, each said rectifying unit including a rod-like stack of a plurality of silicon pellets, a pair of electrodes provided to opposite ends of said rod-like stack, each said electrode being provided with a lead, a first insulating member closely covering said rod-like stack, and a second insulating member covering said first insulating member, at least one conducting wire extending substantially parallel to said rectifying units from the a-c side electrode of a rectifying unit nearest to the a-c side toward the d-c side electrode of the next rectifying unit, said conducting wire being held at the same potential as said a-c side electrode of said rectifying unit nearest to the a-c side, and a third insulating member integrally enclosing said rectifying units and said conducting wire.

2. The high voltage semiconductor rectifying device according to claim 1, which has a plurality of conducting wires of lengths varying stepwise.

3. The high voltage semiconductor rectifying device according to claim 1, wherein said conducting wire has an end portion folded.

4. The high voltage semiconductor rectifying device according to claim 1, wherein said electrodes of said rectifying units are made of a high impurity concentration semiconductor member thicker than said silicon pellets and without any p-n junction.

5. The high voltage semiconductor rectifying device according to claim 1, wherein said insulating members are made of a non-combustible insulating resin.

* * * * *